US010459968B2

(12) United States Patent
Kuroki et al.

(10) Patent No.: US 10,459,968 B2
(45) Date of Patent: Oct. 29, 2019

(54) IMAGE PROCESSING SYSTEM AND IMAGE PROCESSING METHOD

(71) Applicant: CANON KABUSHIKI KAISHA, Tokyo (JP)

(72) Inventors: Tsuyoshi Kuroki, Yokohama (JP); Mikio Kiura, Tokyo (JP); Masakazu Matsugu, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/470,029

(22) Filed: Mar. 27, 2017

(65) Prior Publication Data
US 2017/0199899 A1    Jul. 13, 2017

Related U.S. Application Data

(63) Continuation of application No. 13/592,410, filed on Aug. 23, 2012, now abandoned.

(30) Foreign Application Priority Data

Aug. 25, 2011    (JP) ................ 2011-183838

(51) Int. Cl.
G06F 17/30    (2006.01)
G06F 16/58    (2019.01)
(Continued)

(52) U.S. Cl.
CPC ............ *G06F 16/58* (2019.01); *G06F 16/51* (2019.01); *G06K 9/00677* (2013.01); *H04L 67/10* (2013.01)

(58) Field of Classification Search
None
See application file for complete search history.

(56) References Cited

U.S. PATENT DOCUMENTS 5,901,255 A    5/1999  Yagasaki
6,944,342 B1   9/2005  Stahl et al.
(Continued)

FOREIGN PATENT DOCUMENTS

JP    2005-107978 A    4/2005
JP    2008009914 A     1/2008
(Continued)

OTHER PUBLICATIONS

Japanese Office Action issued in corresponding application No. 2011-183838 dated Jun. 9, 2015.
(Continued)

*Primary Examiner* — Iman K Kholdebarin
(74) *Attorney, Agent, or Firm* — Carter, DeLuca & Farrell LLP (57) ABSTRACT

An image processing system comprises: an image recognizing unit which performs image recognition to an image; a rule setting unit which sets a sorting rule to be used in case of transmitting the image recognized by the image recognizing unit to an external web service; and a transmitting unit which transmits, according to the sorting rule having a condition conforming to the image among the sorting rules set by the rule setting unit, information concerning the image to the corresponding external web service, thereby enabling to cooperate a still image/moving image sharing service and various web services with others.

11 Claims, 6 Drawing Sheets

(51) Int. Cl.
    *G06F 16/51*     (2019.01)
    *G06K 9/00*     (2006.01)
    *H04L 29/08*     (2006.01)

(56) References Cited

U.S. PATENT DOCUMENTS

| | | |
|---|---|---|
| 7,394,977 B2 | 7/2008 | Park et al. |
| 7,480,414 B2 | 1/2009 | Brown et al. |
| 7,881,537 B2 | 2/2011 | Ma et al. |
| 7,886,972 B2 | 2/2011 | Skaaksrud et al. |
| 7,912,246 B1 | 3/2011 | Moon et al. |
| 8,027,544 B2 | 9/2011 | Mitarai et al. |
| 8,254,699 B1 | 8/2012 | Zhao et al. |
| 8,300,917 B2 | 10/2012 | Borgia et al. |
| 8,391,618 B1 | 3/2013 | Chuang et al. |
| 8,488,011 B2 | 7/2013 | Blanchflower et al. |
| 8,625,858 B2 | 1/2014 | Torii et al. |
| 8,645,287 B2 | 2/2014 | Baker et al. |
| 8,675,071 B1* | 3/2014 | Slavin .................... H04M 11/04 348/143 |
| 8,755,635 B2 | 6/2014 | Geiger et al. |
| 8,768,050 B2 | 7/2014 | Kannan et al. |
| 8,792,732 B1 | 7/2014 | Zhao et al. |
| 8,825,493 B2* | 9/2014 | Chang .................... H04L 51/32 704/275 |
| 8,861,804 B1 | 10/2014 | Johnson et al. |
| 9,147,130 B2 | 9/2015 | Saruta et al. |
| 2003/0200234 A1* | 10/2003 | Koppich ................ G06F 16/93 |
| 2005/0096992 A1 | 5/2005 | Geisel et al. |
| 2005/0105806 A1 | 5/2005 | Nagaoka et al. |
| 2005/0198072 A1* | 9/2005 | Iinuma ............... H04N 1/00225 |
| 2005/0200912 A1 | 9/2005 | Yamakado et al. |
| 2006/0098899 A1 | 5/2006 | King et al. |
| 2006/0251339 A1 | 11/2006 | Gokturk et al. |
| 2007/0007349 A1 | 1/2007 | Uchida et al. |
| 2007/0089173 A1* | 4/2007 | Hikichi ................ G06F 21/604 726/26 |
| 2007/0159533 A1 | 7/2007 | Ayaki |
| 2007/0258645 A1 | 11/2007 | Gokturk et al. |
| 2007/0268526 A1* | 11/2007 | Ito ....................... H04N 1/00214 358/403 |
| 2008/0002862 A1 | 1/2008 | Matsugu et al. |
| 2008/0130522 A1* | 6/2008 | Pennington ........... H04L 63/104 370/255 |
| 2008/0212842 A1 | 9/2008 | Burton |
| 2008/0226140 A1 | 9/2008 | Okamura |
| 2009/0060392 A1* | 3/2009 | Nogawa .............. H04N 1/00204 382/305 |
| 2009/0129638 A1 | 5/2009 | Kim |
| 2009/0244096 A1 | 10/2009 | Yamaji et al. |
| 2009/0248692 A1 | 10/2009 | Tsukagoshi et al. |
| 2010/0036912 A1* | 2/2010 | Rao ........................ H04L 51/20 709/204 |
| 2010/0134828 A1* | 6/2010 | Nishiyama ......... H04N 1/00214 358/1.15 |
| 2010/0158315 A1 | 6/2010 | Martin |
| 2010/0172551 A1* | 7/2010 | Gilley ................. G06K 9/00288 382/118 |
| 2010/0278396 A1 | 11/2010 | Mitsuhashi et al. |
| 2010/0287282 A1* | 11/2010 | MacLaughlin ......... G06Q 10/10 709/226 |
| 2010/0293198 A1* | 11/2010 | Marinucci ............. G06Q 10/00 707/784 |
| 2010/0318619 A1* | 12/2010 | Meijer ................... G06Q 10/10 709/206 |
| 2011/0073639 A1* | 3/2011 | Bartholomew ........ G06Q 30/00 235/375 |
| 2011/0128389 A1* | 6/2011 | Maeda ............... H04N 1/00204 348/207.1 |
| 2011/0161084 A1 | 6/2011 | Lin et al. |
| 2011/0176174 A1* | 7/2011 | Terao ................. H04N 1/00442 358/1.15 |
| 2011/0191271 A1 | 8/2011 | Baker et al. |
| 2011/0219333 A1* | 9/2011 | Park .................... H04M 1/72583 715/808 |
| 2011/0288377 A1 | 11/2011 | Anabuki |
| 2012/0110076 A1* | 5/2012 | Su .......................... H04W 4/21 709/204 |
| 2012/0131103 A1* | 5/2012 | Fox ...................... H04L 67/306 709/204 |
| 2012/0141023 A1 | 6/2012 | Wang et al. |
| 2012/0200743 A1 | 8/2012 | Blanchflower et al. |
| 2012/0203764 A1 | 8/2012 | Wood et al. |
| 2012/0269426 A1 | 10/2012 | Mitarai et al. |
| 2012/0290437 A1* | 11/2012 | Hibbard ................ G06Q 30/06 705/26.41 |
| 2012/0316421 A1 | 12/2012 | Kumar et al. |
| 2012/0323930 A1* | 12/2012 | Kennberg ........... G06F 16/5866 707/748 |
| 2013/0159413 A1* | 6/2013 | Davis ................. H04L 29/0872 709/204 |
| 2013/0182918 A1 | 7/2013 | Kovtun et al. |
| 2013/0332321 A1* | 12/2013 | Sanguinetti ........... G06Q 10/08 705/27.2 |
| 2014/0129489 A1 | 5/2014 | Baker et al. |
| 2014/0333792 A1 | 11/2014 | Mitani |
| 2015/0081609 A1* | 3/2015 | Hande ................... H04L 51/32 706/46 |
| 2017/0177887 A1* | 6/2017 | Winters ................ G06F 16/58 |
| 2017/0199899 A1* | 7/2017 | Kuroki ............... G06K 9/00677 |
| 2017/0221158 A1* | 8/2017 | Mitchell ............. G06Q 10/107 |

FOREIGN PATENT DOCUMENTS

| | | |
|---|---|---|
| JP | 2008-165700 A | 7/2008 |
| JP | 2009290260 A | 12/2009 |

OTHER PUBLICATIONS

Keiji Yanai, "Discovering Cultural Differences using Geotagged Images on the Web", Discovery of Difference, Journal of 23th Annual Meeting of the Japanese Society for Artificial Intelligence, 2009.

Tetsu Otoba, "Lifelog by iPHONE" Tatsumi Publishing, 2010.

Keiji Yanai, "The Current State and Future Directions on Generic Object Recognition" Journal of Information Processing Society of Japan: Computer Vision and Image Media, vol. 48, Nov. 2007.

Wen Wu, et al., "Fast Food Recognition from Videos of Eating for Calorie Estimation" Proceedings of IEEE International Conference on Multimedia & Expo (ICME), 2009.

\* cited by examiner

IMAGE PROCESSING SYSTEM AND IMAGE PROCESSING METHOD

CROSS REFERENCE TO RELATED APPLICATIONS

This application is a continuation of U.S. patent application Ser. No. 13/592,410 filed on Aug. 23, 2012, which claims the benefit of and priority to Japanese Patent Application No. 2011-183838, filed on Aug. 25, 2011, each of which are hereby incorporated by reference in their entireties.

BACKGROUND OF THE INVENTION

Field of the Invention

The present invention relates to an image processing system and an image processing method. In particular, the present invention relates to the image processing system which provides a still image/moving image sharing service by which it is possible to use various web services only by transmitting a shot still image/moving image. Incidentally, it should be noted that, in the present application, "still image/moving image" includes "a still image and a moving image" and "a still image or a moving image", and "still images/moving images" includes "still images and moving images" and "still images or moving images".

Description of the Related Art

In recent years, a still image/moving image sharing service in which shot images are uploaded to a server and the uploaded images can be browsed by users who uploaded the images and other users through the Internet has been used by many people. In the still image/moving image sharing service like this, it is possible for a user to add, to each of still images/moving images, a comment, a tag for explaining by words what is shown in the image, and the like. For example, it is described, in "An Analysis of World Cultural Differences using Geotagged Images on the Web" (Keiji Yanai, Discovery of Difference, Journal of 23th General Meeting of Japanese Society for Artificial Intelligence, 2009), that there is the attempt to search the world cultural differences by using the text tags and the position information by the GPS (global positioning system) respectively attached to the photographs collected on the still image/moving image sharing service.

On another front, the web services which are specialized respectively in various intended purposes have been widely generalized on the Internet. These web services include, for example, the service by which the user records the meal taken by the user oneself, the service by which the user records the itinerary of the user oneself, the service to which the user posts the still image/moving image and the short message thereof, and the like. In this surroundings, these web services satisfy various preferences of public users. The web service like this has been described in, for example, "Lifelog by iPhone" (Tetsu Otoba, TATSUMI PUBLISHING, 2010).

Under present circumstances, the still image/moving image sharing service as described above does not well cooperate with various web services. For this reason, the general user usually makes use of the still image/moving image sharing service and various web services independently.

However, various web services include the service which can be used when the user analyzes the shot still image/moving image and transmits the analysis result thereto. For example, there is a web service in which a user analyzes images of his/her meals and records the contents of the meals based on the analysis result. Therefore, in a case where the web service which can be used by the user through the image like this cooperates with the still image/moving image sharing service, the user will be able to utilize the associated web service only by transmitting the necessary image to the still image/moving image sharing service.

SUMMARY OF THE INVENTION

The present invention has been completed in consideration of such a problem as described above, and an object thereof is to enable a user to make use of various web services only by transmitting an image to a still image/moving image sharing service, Further features of the present invention will become apparent from the following description of exemplary embodiments with reference to the attached drawings.

DESCRIPTION OF THE EMBODIMENTS

Hereinafter, preferred embodiments of the present invention will be described in detail with reference to the accompanying drawings.

(First Embodiment)

An image processing system according to the present embodiment is a still image/moving image sharing service which receives still images/moving images from a plurality of users, and sorts the received images to associated web services respectively. More specifically, in the still image/moving image sharing system according to the present embodiment, the still images/moving images may be sorted into an external web service or may not be sorted into the external web service. Further, the still images/moving images may be sorted respectively to a plurality of web services.

Figure 1:
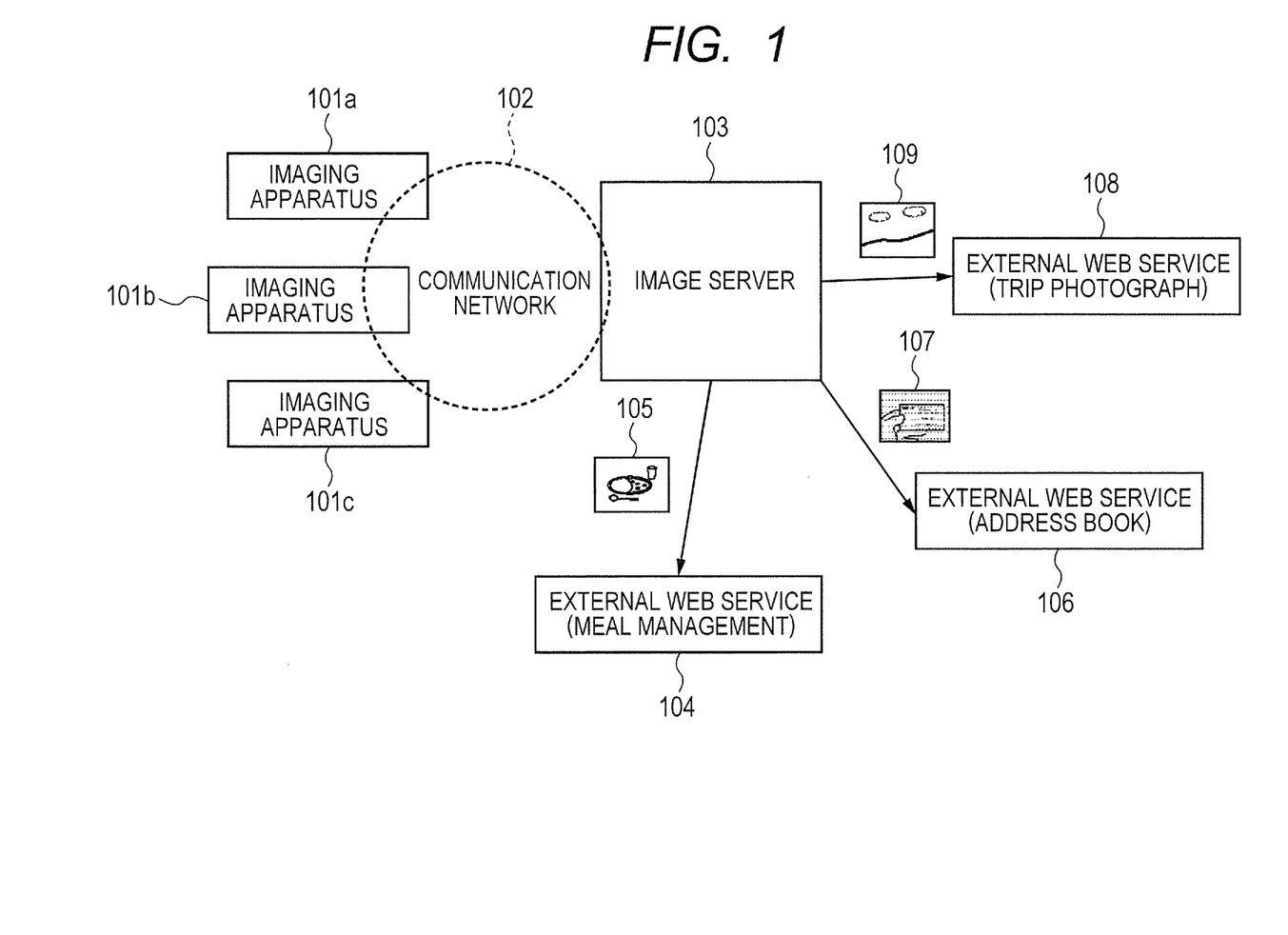
FIG. 1 is a block diagram illustrating a relation among a still image/moving image sharing service and various web services.

FIG. 1 is a block diagram illustrating a relation among imaging apparatuses which are used by users, the still image/moving image sharing service which is used by the users, and various web services which are used by the users, in the present embodiment.

In FIG. 1, for example, imaging apparatuses 101a, 101b and 101c are respectively used by a plurality of users who use the still image/moving image sharing service according to the present embodiment. Incidentally, although the three imaging apparatuses are shown in FIG. 1, it is of course possible to provide four or more imaging apparatuses. In the following description, the imaging apparatuses 101a to 101c will be collectively called an imaging apparatus 101.

The imaging apparatus 101 is constituted to transmit a shot image to an image server 103 through a communication network 102. Here, the imaging apparatus 101 may be constituted by any type of device if it can shoot the image and transmit the shot image through the communication network. For example, the imaging apparatus is constituted by a digital camera or a cellular phone. Further, the imaging apparatus 101 may have a GPS function built-in. In this case, position information obtained by the GPS function is embedded in still image/moving image data of the shot still image/moving image.

The communication network 102 is used to transmit the still image/moving image data shot and obtained by the imaging apparatus 101 to the image server 103. Here, the communication network 102 is constituted by a wireless communication network such as a wireless LAN (local area network) or a mobile public wireless network, or a wire communication network.

The image server 103 is the hardware in which the still image/moving image sharing service according to the present embodiment operates. The image server 103 holds the still image/moving image data transmitted from the plurality of users, and then displays the still image/moving image data when a request from the user is received. Here, the image server 103, which includes a later-described image recognizing unit for recognizing and analyzing the still image/moving image transmitted from the user, transmits the still image/moving image, an analysis result of the still image/moving image, or both the still image/moving image and the analysis result thereof to an external web service if necessary. Incidentally, the image server 103 may be constituted by any hardware if it can operate the still image/moving image sharing service. For example, the image server 103 is constituted by a PC (personal computer) server.

An external web service 104, which is connected to the image server 103, is a meal management web service for performing meal management. More specifically, the meal management web service 104 consists of the PC server and a program running on the PC server. The meal management web service 104 is the service which is widely opened for general users, and is the service which is provided by a business operator different from that of the still image/moving image sharing service.

When the user who has been registered as the user of the meal management web service inputs the contents of daily meals by texts such as "fried poke cutlet bowl", each of the contents of the texts is analyzed, and it is then judged to which of the previously registered meal contents the analyzed content conforms. Here, it should be noted that the previously registered meal contents include meal names and their associated information such as calories, nutrient factors and the like. In any case, the user of the meal management web service can record the contents of his/her meals and use them for the purpose of health care and dieting, only by inputting the name of the daily meal and its rough meal size such as "one-and-half" every time he/she takes the meal.

The meal management web service 104 has an external API (Application Program Interface), and a mechanism for inputting and browsing the records through the network from the outside of the meal management web service 104, i.e., the image server 103, the imaging apparatus 101 connected to the image server 103, and the like. Here, it should be noted that the external API like this is generally provided in the web services of recent years.

An image 105 is an example of the image of a meal which is transmitted from the image server 103 to the meal management web service 104. When the meal is shot by the user with the imaging apparatus 101, the shot image is transmitted to the image server 103, the transmitted image is recognized in the image server 103, and then the meal image 105 and its text-data analysis result are transmitted from the image server 103 to the meal management web service 104. Here, the analysis result includes the information representing the meal name and its rough meal size, such as "set meal of fried pole cutlet; one-and-half" or the like.

An external web service 106, which is connected to the image server 103, is an address management web service for performing address management. More specifically, the address management web service 106 consists of the PC server and a program running on the PC server. The address management web service 106 is the service which is widely opened for general users, and is the service which is provided by a business operator different from that of the still image/moving image sharing service. When the user who has been registered as the user of the address management web service inputs the name and the address information to this service by texts, the address information is registered in the database. Thus, the registered address information can be referred from any apparatus connected to the address management service.

An image 107 is an example of the image of a business card which is transmitted from the image server 103 to the address management web service 106. When the business card is shot by the user with the imaging apparatus 101, the shot image is transmitted to the image server 103, the transmitted image is recognized in the image server 103, and then the business card image 107 and its text-data analysis result are transmitted from the image server 103 to the address management web service 106. Here, the analysis result includes the name and its address information such as "Taro Yamada; yamada@taro.co.jp" or the like.

An external web service 108, which is connected to the image server 103, is a trip still image/moving image management web service for performing management of still images/moving images shot in trips. Here, these images will be simply called the still image/moving image hereinafter. More specifically, the trip still image/moving image management web service 108 consists of the PC server and a program running on the PC server. The trip still image/moving image management web service 108 is the service which is widely opened for general users, and is the service which is provided by a business operator different from that of the still image/moving image sharing service. When the user who has been registered as the user of the trip still image/moving image management web service uploads the still image/moving image to this service, the still image/moving image is automatically sorted based on the position information and the date information respectively embedded in the uploaded still image/moving image. Then, a title is given to the sorted still image/moving image. Incidentally, when the position information is embedded in the still image/moving image, a display to be linked to a map is set based on the embedded position information.

An image 109 is an example of the still image/moving image of a landscape which is transmitted from the image server 103 to the trip still image/moving image management web service 108. When the landscape is shot by the user with the imaging apparatus 101, the shot image is transmitted to the image server 103, the transmitted image is recognized in the image server 103, and then the obtained landscape still image/moving image 109 and its analysis result are transmitted to the trip still image/moving image management web service 108. Here, the analysis result is the text data representing by the words the shot target included in the still image/moving image. For example, the analysis result incudes "Mt. Fuji", "Tokyo Sky Tree", "Ueno Zoological Gardens: Panda" and the like.

As just described, the relation among the imaging apparatus of the user, the still image/moving image sharing service used by the users, and various web services have been described with reference to FIG. 1.

Figure 2:
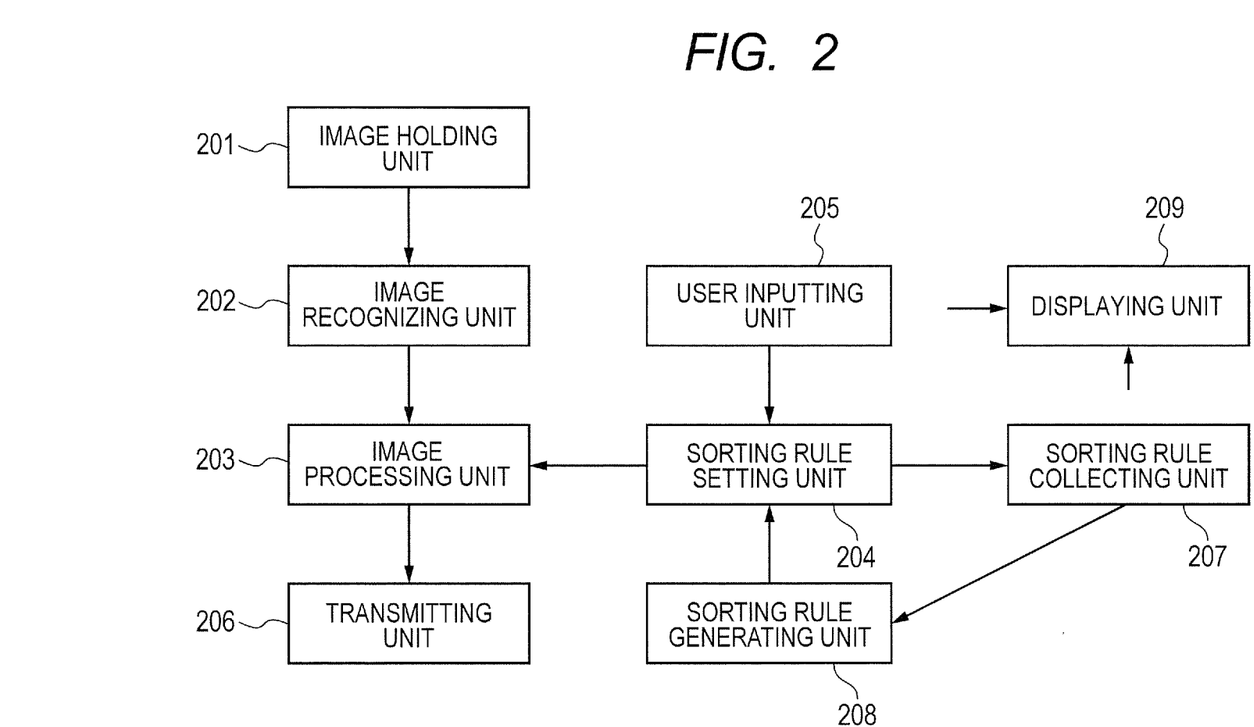
FIG. 2 is a block diagram illustrating an example of the internal constitution of an image server according to a first embodiment of the present invention.

FIG. 2 is a block diagram illustrating an example of the internal constitution of the image server 103. In this drawing, each of the illustrated blocks is constituted by a combination of an HDD (hard disk drive), a CPU (central processing unit), a memory, a program and the like all included in the image server 103. In any case, the example of the constitution of the image server 103 will be described hereinafter with reference to FIG. 2.

An image holding unit 201 receives the image transmitted from the user of the still image/moving image sharing service according to the present embodiment, and stores the received image. Namely, all the still images/moving images transmitted from the users are stored in the image holding unit 201.

An image recognizing unit 202 performs a recognizing process to the image held in the image holding unit 201, sets a recognition result to text data, and associates the set text data with the recognized image. The image recognizing unit 202 classifies the kinds of objects included in the images by using various image recognition algorithms as described in "The Current State and Future Directions on Generic Object Recognition" (Keiji Yanai, Journal of Information Processing Society of Japan: Computer Vision and Image Media, Vol. 48, November 2007). Further, the image recognizing unit 202 performs individual discrimination to a man and an animal by such a method as described in "Japanese Patent Application Laid-Open No. 2008-9914". Then, when an individual name such as a man's name can be identified, the image recognizing unit 202 sets the identified name to text data, and associates the set text data with the recognized image. In any case, to perform the above processes, the image recognizing unit 202 contains a not-illustrated individual database and a not-illustrated object database for classifying objects.

An image processing unit 203 performs simple image processes such as image cutout, resolution change and the like. Further, the image processing unit 203 contains a plurality of libraries for performing various processes, and thus can analyze the images by properly combining these libraries. Here, the plurality of libraries contain an OCR (optical character recognition) process for converting a character image into text data, a process for performing calorie counting from a meal image as described in "Fast food recognition from videos of eating for calorie estimation" (Wen Wu, Jie Yang; Proceedings of IEEE International Conference on Multimedia & Expo (ICME), 2009), a process for extracting a place name from the position information included in the image, and the like.

A sorting rule setting unit 204 sets a rule to be used in case of automatically processing the image of the image server 103 and then transmitting a process result to the external web service. Further, a user inputting unit 205 performs a process of accepting an input from the user of the still image/moving image sharing service according to the present embodiment when the user wishes to set a new sorting rule.

Figure 4:
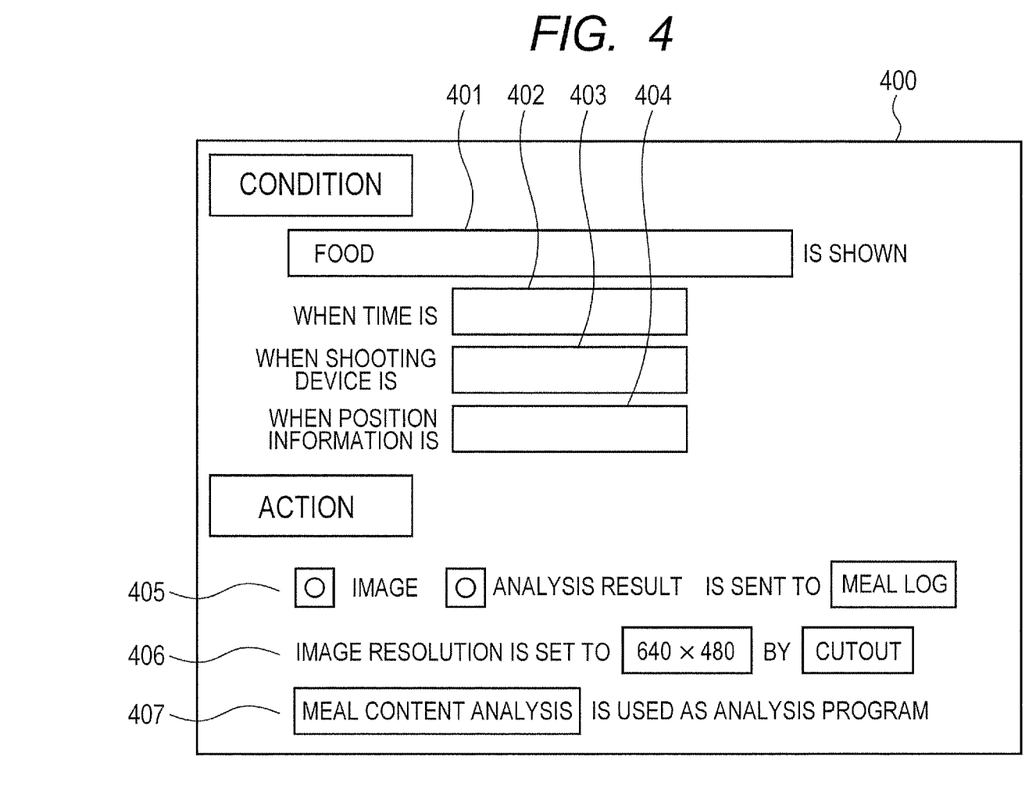
FIG. 4 is a diagram illustrating an example of a sorting rule setting window to be presented to a user.

FIG. 4 is a diagram illustrating an example of a sorting rule setting window to be presented by the user inputting unit 205 to the user. More specifically, a sorting rule setting window 400 illustrated is displayed on a displaying unit 209 when the user of the still image/moving image sharing service according to the present embodiment wishes to set the sorting rule in the case where the user makes use of this service. In any case, the sorting rule setting window 400 will be described hereinafter with reference to the drawing.

On the sorting rule setting window 400, the user describes and inputs both a condition in which the image should be sorted into the external web service and actions which should be performed when this condition is satisfied. More specifically, when the user wishes to set a case where something is shown in the still image/moving image to be the sorting condition, he/she inputs necessary data to a recognition target input field 401. In the recognition target input field 401, the user can input the data in an "AND" condition or an "OR" condition as in the case of inputting data in a text search engine. Further, the user can input both a general noun and a proper noun. Incidentally, FIG. 4 shows the example that "food" has been input as the recognition target to the recognition target input field 401.

Further, when the user wishes to set a time when the shooting of the still image/moving image was performed to be the sorting condition, he/she inputs necessary data to a time designation field 402. In the time designation field 402, the user can input the period of time, the date, the season, the era name, and the like.

Furthermore, when the user wishes to set a shooting device by which the shooting of the still image/moving image was performed to be the sorting condition, he/she inputs necessary data to a shooting device designation field 403. In the shooting device designation field 403, the user can also input the general noun such as "mobile phone", "single-lens reflex digital camera", or the like. Further, the user can input an ID (identification data) inherent to the shooting device.

Furthermore, when the user wishes to set a position where the shooting of the still image/moving image was performed to be the sorting condition, he/she inputs necessary data to a shooting position designation field 404. In the shooting position designation field 404, the user can input the expressions using nouns and adjectives such as "near the home", "in the company", "commutation route", "abroad", and the like.

The user designates the conditions for transmitting both or one of the image and the analysis result to the external web service, by designating one or more of the conditions input to the fields 401 to 404.

Further, the user designates the action to be performed when the image conforms to the sorting condition, in an action designation field 405. In the action designation field, the user can designate whether or not to transmit the image and the analysis result respectively by using the check boxes of "image" and "analysis result". Further, the user can designate the name of the external web service to which the data is transmitted. Alternatively, the user can designate the e-mail address as the external web service. In any case, FIG. 4 shows the designation state that the data should be transmitted to "meal log".

When the image is transmitted to the external web service as the action, the user designates the resolution of the relevant image in an image resolution designation field 406. When the image to be transmitted is reduced in size as compared with the original size, the user can designate, in the image resolution designation field 406, how to reduce the image in such a manner as "cutout", "reduction" or the like.

When the analysis result is transmitted to the external web service as the action, the user designates, in an analysis program designation field 407, by which program the image should be analyzed. The analysis program like this, which is executed in the image processing unit 203, has been described by using the library of the image processing unit 203.

In the still image/moving image sharing service according to the present embodiment, a large number of sets each composed of the external web service capable of being associated and the analysis program corresponding to the relevant external web service have been previously prepared. As the set of the external web service and the analysis program like this, for example, there is a set of the external web service "meal log" and the analysis program "meal content analysis".

When the user designates the above previously registered external web service in the action designation field 405, the corresponding analysis program is automatically input to the analysis program designation field 407. As the analysis program like this, for example, there is "meal content analysis", "business card analysis", "tagging of still image/ moving image", or the like.

Further, the user can designate an external web service not previously registered in the still image/moving image sharing service. In this case, the user can create an analysis program corresponding to the relevant external web service by using the library of the image processing unit 203.

The sorting rule which is set on the sorting rule setting window 400 illustrated in FIG. 4 is then stored as a user-input sorting rule in the sorting rule setting unit 204. Further, the sorting rule is transmitted to a sorting rule collecting unit 207.

As just described, the sorting rule setting window 400 has been described with reference to the drawing. Subsequently, the description will be returned to that for the constitution of the image server 103 illustrated in FIG. 2.

After the image process was performed by the image processing unit 203, when there is the process result which conforms to the already-set condition of the sorting rule, a transmitting unit 206 performs a process of transmitting the process result to the external web service. More specifically, the transmitting unit transmits the processed image, the image analysis result, the direct image or a possible combination thereof to the external web service in accordance with the service of the sorting destination.

The sorting rule collecting unit 207 is the portion which collects all the sorting rules used by the users of the still image/moving image sharing service according to the present embodiment. Here, the sorting rule collecting unit 207 further includes the portion for performing a statistical process, thereby being able to analyze such information as indicating which of various sorting rules collected is frequently used.

A sorting rule generating unit 208 generates a sorting rule which is suitable for the user of the still image/moving image sharing service according to the present embodiment. The displaying unit 209 displays the image stored in the image holding unit 201, the process result, the sorting rule setting window 400, and the like. As just described, the example of the constitution of the image server 103 has been described.

Figure 3:
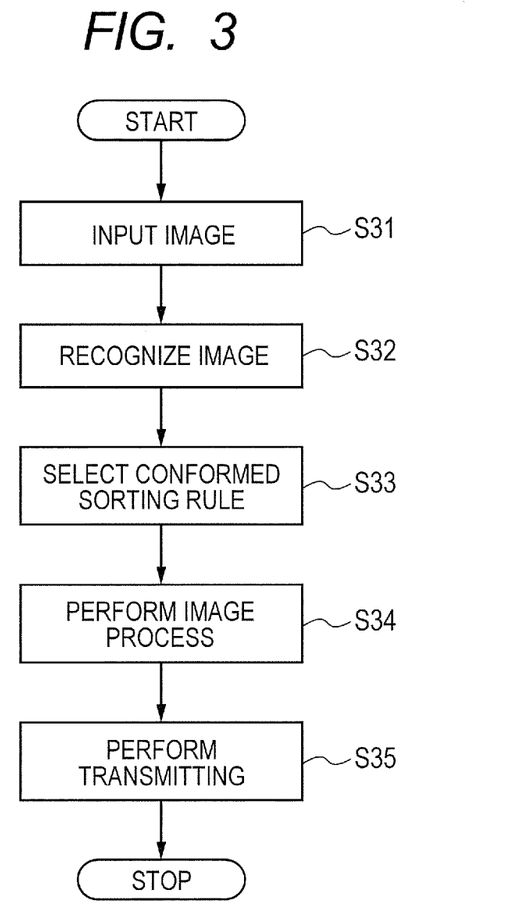
FIG. 3 is a flow chart indicating a process to be performed when an image is input and transmitted.

FIG. 3 is a flow chart indicating a process to be performed by the image server 103 when the image is transmitted from the user.

In S31, the image transmitted from the user is stored in the image holding unit 201. Subsequently, in S32, the image stored in the image holding unit 201 is drawn therefrom and subjected to the image recognition by the image recognizing unit 202. Then, the recognition result obtained is associated with the recognized image and stored as the text data in the image holding unit 201.

In S33, it is judged by the image processing unit 203 whether or not there is the set of the image and the associated information both stored in the image holding unit 201 which satisfies the condition of the sorting rule held in the sorting rule setting unit 204. Here, it should be noted that such a judging process is performed by the number of times corresponding to the number of the set sorting rules.

In S34, the action set on the sorting rule setting window 400 of FIG. 4 is performed with respect to the sorting rule satisfying the sorting condition by the image processing unit 203. Here, when the transmission of the analysis result has been designated as the sorting action, the designated analysis program is executed and then the analysis result is transmitted.

Incidentally, such programs as described below will be conceivable as the analysis programs to be executed in S34. For example, there is a program of analyzing the meal image 105, outputting based on the analysis result the name and the approximate amount of the meal as text data, and outputting the nutrient factors and the amount of calorie included in the relevant meal as text data (meal content analysis). Further, there is a program of analyzing the business card image 107, and outputting based on the analysis result the name and the address information shown in the business card image as text data (business card analysis). There is a program of analyzing the landscape still image/moving image 109 (souvenir picture), and outputting based on the analysis result the name and the ID information of the shot person as text data (shot person analysis). There is a program of analyzing a photograph including a book, identifying what the included book is, and outputting the identified title of the book as text data (book title analysis). There is a program of analyzing a photograph of flora and fauna, and outputting a caption for describing the subject shown in the photograph as text data (flora and fauna analysis). Here, it should be noted that such judgment of the action is performed to all of the sorting rules which satisfy the sorting condition.

In S35, the action performed and obtained in S34 is transmitted to the corresponding external web service. Such a transmission process of the action to the external web service is performed by, for example, using the API provided by the external web service, or transmitting the e-mail in the format permitted by the external web service.

As the external web service to which the process result is transmitted in S35, for example, there are conceivable a meal management web service by which the user manages contents of each of his/her meals, an address book web service by which the user manages addresses, a shopping web service by which the user previously registers a thing that the user wants and which provides a place on the Internet where the user can buy the relevant thing at a lowest price, a still image/moving image sharing service by which the user can input the shot still image/moving image and the subject of the relevant image as text data, a micro blog service and a social network service by which the user can post a still image/moving image and its brief comment, a position information service in which the place where the user went is registered, and the like.

As just described, the flow of the process to be performed in the image server 103 when the image is transmitted from the user has been described with reference to FIG. 3.

In the still image/moving image sharing service according to the present embodiment, the user can adopt the sorting rule recommended by the still image/moving image sharing service without voluntarily setting rules in detail.

Figure 5:
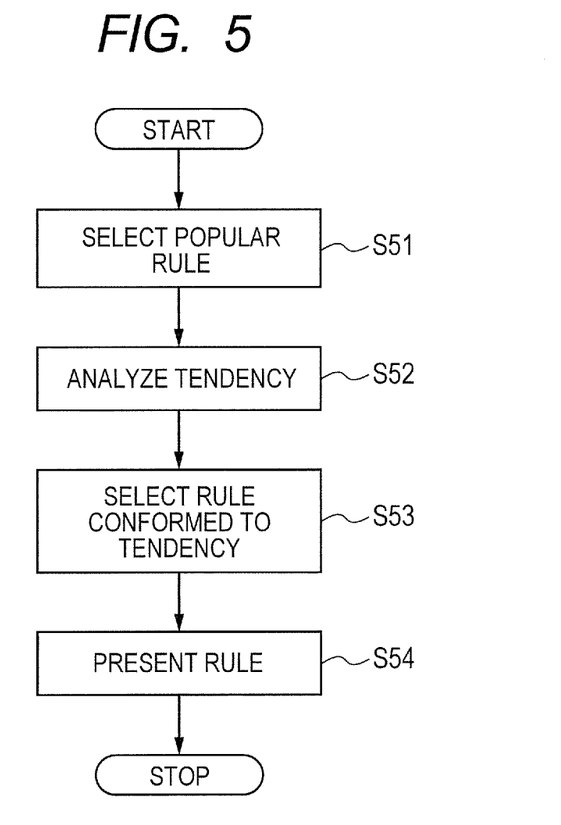
FIG. 5 is a flow chart indicating a process to be performed when a sorting rule is presented.

FIG. 5 is a flow chart indicating a process to be performed by the image server 103 when the sorting rule recommended to the user is presented. Hereinafter, the actual flow of the process will be described with reference to the drawing.

In any case, when the user of the still image/moving image sharing service according to the present embodiment selects an item "recommendation of sorting rule" on the menu screen provided by the still image/moving image sharing service that the user uses, the procedure of the process illustrated in FIG. 5 is performed.

In S51, a popular rule is selected. In other words, the process in this step is to select the generally popular rule from the sorting rules which are used by the users of the still image/moving image sharing service according to the present embodiment. More specifically, such selection of the popular rule can be performed by the sorting rule collecting unit 207 in any manner. In any case, in the present embodiment, the selection of the popular rule is performed according to the following procedure.

At first, the sorting rule collecting unit 207 calculates utilization ratios of the users for all the external web services set as the sorting destinations. Here, it should be noted that the utilization ratio is equivalent to the ratio or the percentage of the external web service which has been set by the users as the sorting destination. Thus, the utilization ratios of all the external web services are calculated in this way, and it is then judged whether or not the sorting rule has been set by the user to the external web service which has the highest utilization ratio.

When the sorting rule has already been set by the user to the relevant external web service, the external web service having the next highest utilization ratio is selected, and finally one external web service is selected. Incidentally, although only one external web service having the high utilization ratio is selected in the present embodiment, all the external web services respectively having the high utilization ratios equal to or higher than a predetermined level may be selected.

Subsequently, the most commonly used sorting rule is selected with respect to the selected external web service. More specifically, such selection is achieved by taking the sorting rules of which the sorting destinations are the selected external web service from among the sorting rules accumulated in the sorting rule collecting unit 207 and then selecting the most majority of sorting rule or the sorting rule extracted by the sorting rule statistical process.

In S52, the tendency of the relevant user is analyzed. In other words, the process in this step is to analyze what kind of tendency the relevant user shows when he/she shoots the still image/moving image, on the basis of the collection of the still images/moving images shot by the relevant user or the gathering of the users. Such tendency analysis may be performed in any manner if it can analyze the tendency of the shooting targets of the still images/moving images shot by the user. However, in the present embodiment, the tendency analysis is performed according to the following procedure.

At first, the sorting rule generating unit 208 analyzes, from the image holding unit 201, the collection of the still images/moving images shot by the relevant user, analyzes the themes of the respective still images/moving images, and classifies these themes into "landscape", "people", "thing" and "other". Incidentally, such analysis of the themes of the still images/moving images has been generally performed in a commercially available digital camera, whereby such a technique can be applied in this process.

Subsequently, the image recognizing unit 202 performs the image recognition to each of the still images/moving images sorted in "thing", and further classifies the thing being the theme into a plurality of kinds. Here, the kinds to be used in such classification include "flower", "dog", "cat", "automobile", "train", "receipt", "charge slip", "food", "business card", "leaflet", "signboard", "clothes", "shoes", and the like.

As just described, the statistical process is performed after the classification of the kinds of shot things. Then, when the number of the still images/moving images obtained by significantly shooting the specific thing is larger than the average number of the still images/moving images shot by the users, it is judged that the relevant user frequently shot the relevant specific thing. Although the tendency of the user is analyzed only based on the contents of the shot images in the present embodiment, the present invention is not limited to this. For example, it is also possible to analyze the tendency of the user by using the time when the still image/moving image was shot, the position where the still image/moving image was shot, or the like.

In S53, the most remarkable one of the user's tendencies obtained in the tendency analysis in S52 is selected, and the sorting rule most generally used for such a target is selected. The process in this step is achieved by taking the sorting rules using the selected tendency as the sorting condition from among the sorting rules accumulated in the sorting rule collecting unit 207 and then selecting the most majority of sorting rule in the taken rules. Incidentally, although only one sorting rule most remarkable as the tendency of the user is selected in the present embodiment, it is also possible to select all the sorting rules within the range of the higher predetermined number.

In S54, one of the popular sorting rules selected in S51 and one of the sorting rules conforming to the tendency selected in S53 are presented in turn to the relevant user as the sorting rule setting window illustrated in FIG. 4, and then it is judged based on the input from the user inputting unit 205 whether or not the presented sorting rule is adopted by the relevant user.

As above, the flow of the process to be performed when the sorting rule recommended to the user is presented has been described. Although the above procedure is started when the user designates the item "recommendation of sorting rule" on the menu screen provided by the still image/moving image sharing service in the present embodiment, the present invention is not limited to this. That is, for example, the above procedure may be started when the user accesses the still image/moving image sharing service on the first of every month.

As above, the image processing system of the present embodiment which constitutes the still image/moving image sharing service of accepting the images from the plurality of users and sorting the accepted images into the associated web services respectively has been described with reference to the attached drawings. Incidentally, although many processes are performed by the image server 103 in the present embodiment, the constitution of the image processing system of the present invention is not limited to this. That is, a part or a great part of the processes may be performed inside the imaging apparatus.

(Second Embodiment)

As well as the first embodiment, an image processing system according to the present embodiment is related to a still image/moving image sharing service which accepts images from a plurality of users and sorts the accepted images to associated web services respectively. In the above first embodiment, the images are sorted from the still image/moving image sharing service into the connected various external web services according to the rule-based process which is similar to a mail filtering process. However, in the present embodiment, an example that the images are sorted from the still image/moving image sharing service into the various external web services by a learning-based method will be described hereinafter.

In the present embodiment, the user manually decides the external web service to which each of the still images/moving images is sorted. Then, the sorting results decided by the user are collected by the image processing system, and tendencies of the sorting are learned. As a result of the learning, the sorting for which the remarkable tendency can be seen is automatically performed since then. Hereinafter, the image processing system according to the present embodiment will be described with reference to the drawing.

In the present embodiment, a relation among an imaging apparatus of the user, a still image/moving image sharing service used by the user, and various web services used by the user is the same as that described in the first embodiment, and this relation is represented by FIG. 1.

Figure 6:
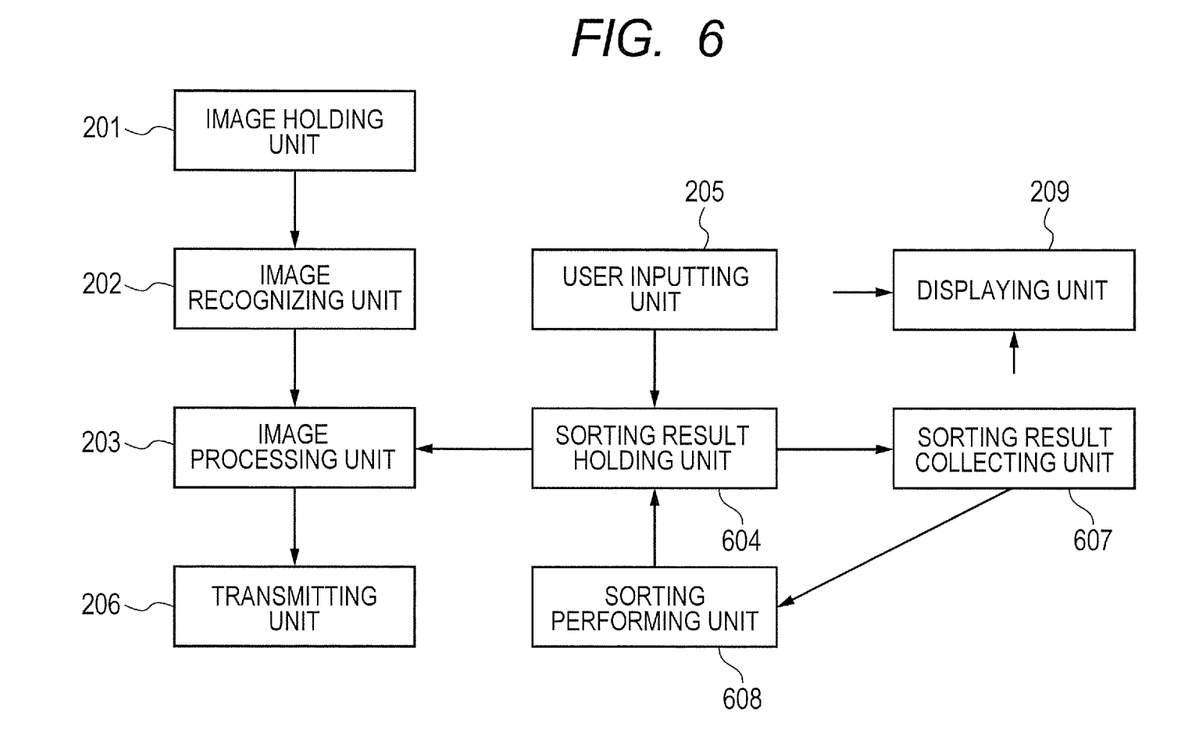
FIG. 6 is a block diagram illustrating an example of the internal constitution of an image server according to a second embodiment of the present invention.

FIG. 6 is a block diagram illustrating an example of the internal constitution of an image server 103 according to the present embodiment. In this drawing, each of the illustrated blocks is constituted by a combination of an HDD, a CPU, a memory, a program and the like all included in the image server 103.

Hereinafter, the example of the constitution of the image server 103 will be described with reference to FIG. 6. In FIG. 6, the constitutions of an image holding unit 201, an image recognizing unit 202, an image processing unit 203, a user inputting unit 205, a transmitting unit 206 and a displaying unit 209 are respectively the same as those already described in the first embodiment, whereby the detailed descriptions thereof will be omitted.

A sorting result holding unit 604 obtains the sorting results of the still images/moving images manually sorted by the user into the external web services, and holds therein the obtained sorting results. Here, it should be noted that ID information of the still image/moving image and ID information to be uniquely allocated by the sorting result holding unit 604 to the external web service to which the still image/moving image is sorted are held in the sorting result holding unit.

A sorting result collecting unit 607 collects the sorting information of all the users, and performs learning and analyzing about the collected information. In the present embodiment, the sorting result collecting unit 607 collects, from all the users, the information of the set of "(the ID information of the still image/moving image) and (the ID information of the external web service to which the still image/moving image is sorted)".

After then, the text data representing the image recognition results of all the still images/moving images stored in the image holding unit 201 are taken from "(the ID information of the still image/moving image)". Subsequently, it is assumed that, on the basis of the data thus obtained, the automatic sorting is performed to the still image/moving image showing the sorting tendency higher than a predetermined index, by using a known learning method such as a Bayesian Filter method generally used in a spam filter for e-mails, or the like.

A sorting performing unit 608 actually performs the sorting with respect to the sorting tendency which has been judged by the sorting result collecting unit 607 to be higher than the predetermined index. The sorting to be performed by the sorting performing unit 608 is performed to all the still images/moving images of all the users, but does not change the sorting result which was manually decided by the user and has been already performed. Incidentally, it is also possible to provide an automatic sorting confirming unit which causes the user to confirm whether or not to allow the sorting performing unit 608 to perform the automatic sorting.

As just described, the learning-based still image/moving image sorting method according to the present embodiment has been described. Incidentally, in the present embodiment, the learning is performed by using the text data representing the recognition result of the still image/moving image. However, the image processing system according to the present invention is not limited to this. For example, the learning may be performed from information indicating an image feature amount, a shooting time, a shooting position, a shooting device or the like. Moreover, in addition to the Bayesian Filter method, an SVM (Support Vector Machine) method, a neural network method or the like may be used.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus, which is connected with an imaging device via a network and connected to a plurality of external social networking web services, the information processing apparatus comprising:
    one or more processors; and
    a memory storing a plurality of sorting rules each defining an action to be executed on an image and a condition for executing the action and instructions, which when executed by the one or more processors, causes the information processing apparatus to:
        receive an image from the imaging device via the network;
        recognize the received image by performing image recognition to obtain text data associated with the received image;
        select a sorting rule in which the condition is satisfied by the received image and the associated text data satisfies, from the plurality of sorting rules stored in the memory;
        perform an action defined in the selected sorting rule, on at least one of the received image and the associated text data;

display, on a display, the plurality of external social networking web services to which the received image is to be transmitted;

accept an input of an external social networking web service selected by a user of the information processing apparatus from among the displayed plurality of external social networking web services; and transmit the image associated with the text data to the external social networking web service selected by the user of the information processing apparatus.

2. The information processing apparatus according to claim 1, wherein, in a case where the plurality of external social networking web services are selected by the user of the information processing apparatus, the execution of the instructions by the one or more processors further causes the information processing apparatus to accept inputs of the plurality of selected external social networking web services.

3. The information processing apparatus according to claim 1, wherein the execution of the instructions by the one or more processors further causes the information processing apparatus to display the plurality of external social networking web services when for each of which a usability ratio by another user is equal to or higher than a predetermined level.

4. The information processing apparatus according to claim 1, wherein the execution of the instructions by the one or more processors further causes the information processing apparatus to display the plurality of external social networking web services based on at least one of a time and a position that the image is captured.

5. The information processing apparatus according to claim 1, wherein the execution of the instructions by the one or more processors further causes the information processing apparatus to confirm the accepted external social networking web service.

6. The information processing apparatus according to claim 1, wherein, in a case where a predetermined operation is performed by the user of the information processing apparatus on a menu screen of the external social networking web service, the execution of the instructions by the one or more processors further causes the information processing apparatus to display the plurality of external social networking web services.

7. The information processing apparatus according to claim 1, wherein the execution of the instructions by the one or more processors further causes the information processing apparatus to:
capture the image; and
input the captured image.

8. The information processing apparatus according to claim 1, wherein the information processing apparatus includes a cellular phone.

9. An information processing method for an information processing apparatus, which is connected with an imaging device via a network and connected to a plurality of external social networking web services, the information processing method comprising:

receiving an image from the imaging device via the network;

recognizing the received image by performing image recognition to obtain text data associated with the received image;

selecting a sorting rule in which a condition is satisfied by the received image and the associated text data satisfies, from a plurality of sorting rules, stored in a memory, each defining an action to be executed on an image and a condition for executing the action;

performing an action defined in the selected sorting rule, on at least one of the received image and the associated text data;

displaying, on a display, the plurality of external social networking web services to which the received image is to be transmitted;

accepting an input of an external social networking web service selected by a user of the information processing apparatus from among the displayed plurality of external social networking web services; and transmitting the image associated with the text data to the external social networking web service selected by the user of the information processing apparatus.

10. A non-transitory computer-readable storage medium storing a program for controlling a computer which is connected with an imaging device via a network and connected to a plurality of external social networking web services to execute a method comprising:

receiving an image from the imaging device via the network;

recognizing the received image by image recognition to obtain text data associated with the received image;

selecting a sorting rule in which a condition is satisfied by the received image and the associated text data satisfies, from a plurality of sorting rules, stored in a memory, each defining an action to be executed on an image and a condition for executing the action;

performing an action defined in the selected sorting rule, on at least one of the received image and the associated text data;

displaying, on a display, a plurality of external social networking web services to which the received image is to be transmitted;

accepting an input of an external social networking web service selected by a user of the computer from among the displayed plurality of external social networking web services; and transmitting the image associated with the text data to the external social networking web service selected by the user of the computer.

11. The information processing apparatus according to claim 1, wherein the execution of the instructions by the one or more processors further causes the information processing apparatus to convert resolution of the received image.

* * * * *